Jan. 24, 1933.                 G. GAILUS                 1,895,157
                            POTATO HARVESTER
                            Filed May 11, 1931
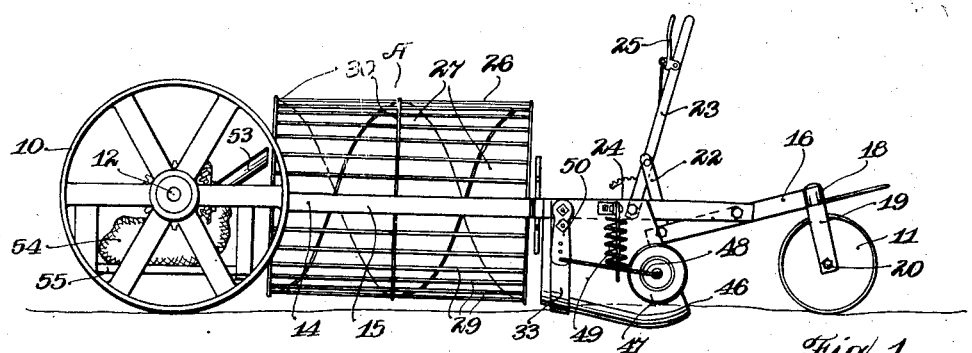
Fig. 1
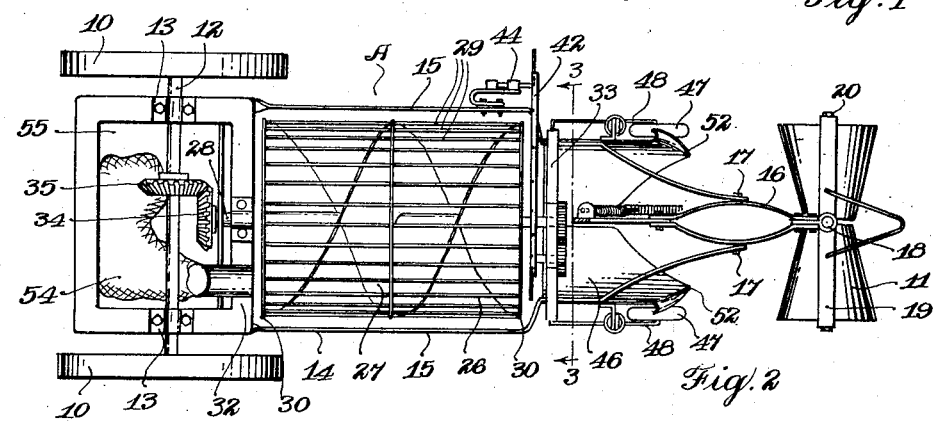
Fig. 2
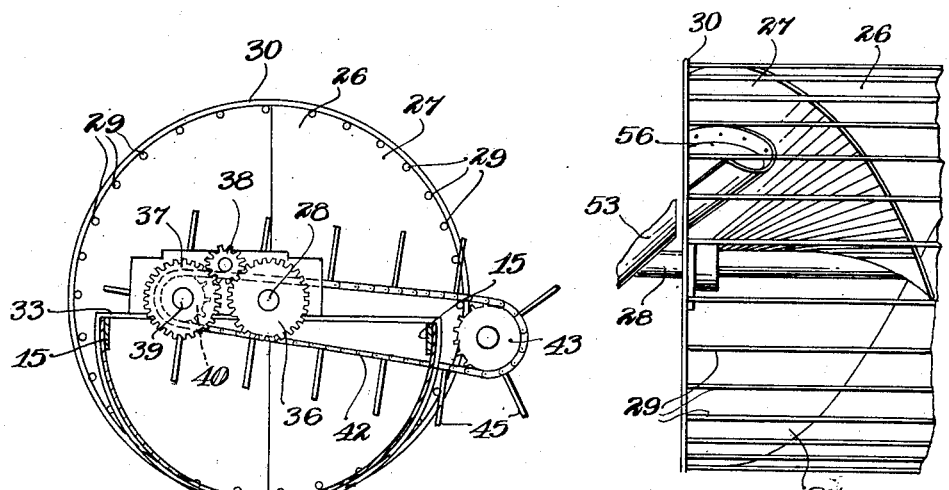
Fig. 3                                          Fig. 4
Inventor
George Gailus
By Howard Riches
                Attorney Patented Jan. 24, 1933

1,895,157

UNITED STATES PATENT OFFICE

GEORGE GAILUS, OF STILLWATER, MINNESOTA

POTATO HARVESTER

Application filed May 11, 1931. Serial No. 536,343.

My invention relates to an improvement in harvesting machines, of the type particularly adapted for harvesting potatoes. My construction embodies a combination of elements which co-operate to produce a potato digger of a simple and effective nature.

While I am aware that potato digging machines have been produced heretofore, some of which employ a scoop and a rotary separator, I believe my construction includes novel features which are valuable additions to the art, and which act together to provide a more efficient potato harvester than has heretofore been produced.

It is the object of my invention to provide a potato digging machine which will unearth the potatoes, separate the dirt and vines from the same, and deposit them in a receptacle. In this manner the potatoes being harvested may be prepared directly for storing or marketing without the necessity of handling or sacking.

It is a feature of my invention that the plow or scoop which is used to dig the potatoes from the ground is divided into two separate parts, leaving an open space between these two parts through which vines and roots may pass, but which is not sufficiently wide to allow the potatoes to drop. Accordingly, the vines and roots within the scoop are separated to a large degree in the scoop, the vines being guided by the rounded edges of the double scoop or plow to pass between the two parts thereof, and the upward incline of the scoop guiding the potatoes into the rotary separator. This construction eliminates much of the usual mechanism necessary for separating the vines and roots from the potatoes.

It is a feature of my invention to provide a chain or belt equipped with a number of prongs or teeth spaced at intervals interposed between the scoop and the rotary separator for the purpose of raking away any loose foliage, vines or foreign matter from the mouth of the rotary separator, and to prevent such material from entering the separator. This eliminates a large portion of the separating necessary, and the separator needs only separate the dirt and soil from the potatoes, as very little loose material such as vines and roots is allowed to enter the separator.

It is an added feature of my invention to provide a pair of small wheels, one of which is mounted on each side of the scoop or plow. These wheels are held under spring tension to ride upon the surface of the ground, and act to press down the vines and foliage along the side of the scoop to prevent this material from being picked up by the scoop. The vines on either side of the scoop are pressed down by these wheels out of the path of the scoop and rotary separator, and are held by them as the earth is dug up around the potatoes, separating the earth from the vines. These wheels are found in actual practice to accomplish this result in a very practical manner, and in combination with the double frusto-conical front roller which flattens out the vines along the ground is a very valuable addition to the art.

It is the purpose of my invention to form pockets at the rear end of the conveyors within the rotary separator into which the potatoes pass automatically and which elevate the potatoes to deposit the same in a trough down which the potatoes may pass to be sacked. The elevation afforded by the pockets is sufficient to permit the potatoes to drop directly from the trough into a sack or container carried at the rear of the harvester.

Other objects and novel features of my invention will be more clearly and fully set forth in the following specification and claims.

In the drawing forming a part of this specification:

Figure 1 illustrates a side elevation view of my potato harvester.

Figure 2 is a top plan view of my potato harvester.

Figure 3 is a cross-sectional view on the lines 3—3 of Figure 2.

Figure 4 is a detail view of a portion of my harvester, illustrating one of the pockets at the rear end of the conveyor for elevating the potatoes.

My potato harvester A is adapted to be pulled along the row of potatoes by any suitable means. The weight of the harvester is supported by a pair of rear wheels 10 and a front roller 11. The rear wheels 10 are mounted upon an axle 12 passing through suitable bearings 13 on the rear portion 14 of the frame. A pair of spaced side members 15 extend from the rear end of the digger toward the front of the same, and are bent to converge toward one another. Between the spaced front ends of the side members 15, the front portion 16 of the frame is positioned, pivotally connected to the side members 15 at 17. The front portion 16 of the frame is connected at one end to a pivot pin 18 which is mounted upon a yoke 19 forming the support for the ends of the axle 20 upon which the front roller 11 is positioned. The other end of the front portion 16 of the frame is secured by means of the link 22 to the lever 23. By operating the handle lever 23, the front portion 16 of the frame may be pivoted with relation to the rear portion 14 of the frame, to raise or lower the center of the frame and the parts associated therewith. The handle lever 23 is held in adjusted position by means of a gear segment 24 on the frame and a pawl or dog on the lever 23 operated by means of a hand release 25.

Suspended between the side members 15 of the rear portion 14 of the frame, I position the rotary separator 26. This separator 26 comprises a double bladed spiral conveyor 27 mounted upon a shaft 28, and enclosed by a plurality of longitudinally extending parallel bars 29 held in position by means of hoops 30. The bars 29 of this cage-like enclosure are spaced apart sufficiently to permit dirt or soil to drop between the same, but will prevent potatoes from dropping out of the separator. The ends of the shaft 28 are supported in suitable bearings upon the cross members 32 and 33, and a bevel gear 34 is mounted against turning upon the shaft 28 in engagement with a similar complementary bevel gear 35 on the rear axle 12 which is rotated by one of the rear wheels 10. Thus as the harvester A is pulled along the ground, the rotation of the rear wheels 10 acts to revolve the rotary separator 26 on its shaft 28.

On the front end of the shaft 28 is provided a gear 36 which rotates a gear 37 by means of an idle gear 38 engaging both of the gears 36 and 37. The shaft 39 of the gear 37 extends through a bearing and operates a sprocket 40. A chain 42 operates between the sprocket 40 and a sprocket 43 mounted upon a spring arm 44 on the side member 15 of the frame. Teeth or fingers 45 on the chain 42 act as a rake to pull the vines and loose foliage away from the open end of the rotary separator 16, and to one side of the digger. The spring arm support 44 keeps the chain 42 taut at all times.

The actuated scoop or divided plow 46 is secured to both sides of the frame 15 and is of a particular design adapted to dig the potatoes and separate the same from the vines. The scoop 46 is trough shaped, having actuated sides, and is split in the center to provide an opening between the two sides of the same. Accordingly, the vines and roots need not be cut off by the scoop, but may be forced inwardly by the curved edge of the divided scoop to pass through the space between the sides of the scoop, and beneath the rotary separator.

On either side of the scoop 46 I provide a wheel 47 which is secured to a pivoted rod 48 and forced downwardly in contact with the surface of the ground by means of a coil spring 49. The position from which the rod 48 may pivot may be adjusted by inserting the bent end of the rod through one or another of the holes in the attaching plate 50 mounted adjacent the side of the scoop. The wheels roll over that portion of the vines which is outside of the points 52 of the scoop 46, and hold the same from being pulled into the scoop with the dirt and potatoes, the action of the scoop pulling the vines and roots free from the dirt and the potatoes passing up the trough shaped scoop 46.

In order that the potatoes may be elevated sufficiently to permit them to be dropped through a trough 53 into a sack 54 or container resting upon a platform 55 suspended from the rear end of the frame, I provide a pocket 56 secured to each of the blades of the conveyor 27 at the end thereof. When the potatoes are conveyed to the end of the rotary separator 26 by the conveyor 27, they will become lodged in one of the pockets 56, where the rotation of the separator 26 will act to drop the potatoes into the trough 53, where they will roll by gravity into the sack 54.

I have found my potato harvester very practical in digging up potatoes and forcing them into the rotary separator or squirrel cage receiver for the potatoes. The scoop 46 is spaced from the open front of the separator slightly, but not sufficiently to permit any of the potatoes to drop therebetween. The rotation of the separator acts to separate the dirt and soil from the potatoes, and to elevate them sufficiently to permit them to be sacked. I have found my design of scoop is very effective in preventing vines from entering the separator, and together with the action of the wheels 47 on either side of the scoop 46 and the raking action of the teeth or fingers 45, forms a combination of parts which practically eliminates the entry of vines or foliage from the separator.

In order that the potato digger A may turn corners with a minimum of ease, I divide the front roller 11 in the center, forming two separate truncated cones mounted upon the axle 20. The roller of this design rolls over the rows of potatoes which are ordinarily higher in the center than on the sides, due to the hilling of the potatoes, and in turning corners, one of the ends of the roller 11 may turn faster than the other end as this end travels an arc of greater radius.

In accordance with the patent statutes, I have described the principles of operation of my potato digger or harvester, and while I have endeavored to set forth the best embodiment thereof, I desire to have it understood that this is only illustrative of a means of carrying out my invention, and that obvious changes may be made within the scope of the following claims without departing from the spirit of the invention.

I claim:

1. A potato digger including, a frame, wheels supporting said frame, a rotary separator mounted upon said frame, gear means for driving said separator from one of said wheels, means for digging potatoes and introducing them into said separator, a pair of sprockets transversely aligned on a vertical plane, a chain on said sprockets interposed between said digging means and said separator and prongs on said chain for extracting the vines and foliage from the earth and potatoes passing into said separator.

2. A potato digger including, a frame, wheels supporting said frame, a rotary separator upon said frame driven by one of said wheels, a scoop for digging potatoes and introducing the same into said separator, sprocket and chain means on a vertical plane extending transversely between said separator and said scoop, and fingers on said chain to rake foliage and vines away from the separator.

3. A potato digger including, a frame, wheels supporting said frame, a rotary separator upon said frame driven by one of said wheels, a scoop for digging potatoes and introducing the same into said separator, chain and sprocket means driven by said separator transversely across the front of said separator, and fingers on said chain to rake the vines and foliage passing from said scoop toward said separator transversely out of the path thereof.

4. A potato harvester including, a separator for separating soil from potatoes, a scoop for digging said potatoes and introducing the same into said separator, pivoted arms mounted on either side of said scoop, wheels pivotally mounted to the free ends of said arms, and spring means for holding said wheels normally in contact with the surface of the earth in the operation of said harvester.

5. A potato harvester including, a frame comprising two pivoted parts adjustably hinged together to raise and lower the center portion thereof, a scoop and a rotary separator mounted upon said frame and adapted to be raised and lowered with said frame, arms pivoted upon either side of said scoop, wheels secured to said pivoted arms, and spring means for holding said wheels in contact with the surface of the earth when said scoop is in lowered position.

6. A vegetable root harvester including, a divided plow for elevating the vegetables out of the ground, the vines being permitted to pass between said divided plow, means carried on either side of said plow for holding the vines and foliage down against the ground, a squirrel cage receiver for the vegetables including a spiral conveying means, and means for rotating said cage to carry the vegetables to the back end thereof in the operation of said harvester.

7. A vegetable harvester including, a roller adapted to flatten the foliage of the vegetables against the ground, a digging plow positioned directly back of said roller, said plow being formed in two sections to provide a longitudinal slot between the same, spring roller wheels supported on either side of said plow, a squirrel cage receiving conveyor for the vegetables directly back and closely adjacent to said plow, a frame suspended centrally over said roller at the front of said harvester and extending back over said plow along either side thereof and along the sides of said squirrel cage conveyor, axle and wheel means for supporting the rear end of said frame, and means for rotating said squirrel cage conveyor by said wheels at the rear of said harvester.

8. A vegetable harvester including, a longitudinal frame, the forward ends of which converge together to a central point, roller means adapted to support a frame yoke extending over the same, the forward end of said frame being pivotally supported on said yoke, spaced apart wheels for supporting the back of said frame, a squirrel cage conveyor having a spiral conveying element therein rotatably mounted between the sides of said frame and extending longitudinally therewith, an arcuated divided lifting plow forwardly disposed adjacent said squirrel cage conveyor, and said squirrel cage conveyor being operated by said wheel means at the rear of said frame.

9. A vegetable harvester including, a squirrel cage conveyor having a spiral conveying means therein to carry the vegetables from the front toward the back of said conveyor, shaking the dirt off of the same, an arcuated plow positioned at the front of said cage conveyor, to carry the vegetables out of the ground into said conveyor, yieldably mounted wheels on either side of said plow, means for raising and lowering said plow, a foliage flattening roller at the front of said plow, supporting and operating wheels at the rear of said cage conveyor, and a frame suspended from said front roller to said wheels at the rear and adapted to support said plow thereon, said wheels rotating said cage conveyor.

10. A vegetable harvester including, a longitudinally disposed frame formed with parallelly extending side members, a forward portion formed on said frame converging together to a single point, a bearing roller having means for flattening the foliage and adapted to support the front end of said frame at a common point virtually centrally disposed in relation to said roller, a vegetable root lifting plow hung from said frame, means for adjusting said plow to raise and lower the same, said plow having a longitudinal central slot in the bottom thereof and having digging pointed ends projecting toward the front and on either side thereof, a rotatable squirrel cage conveyor having a spiral conveying element therein to carry the vegetables to the back thereof, rear wheels for supporting said frame and adapted to operate said cage conveyor.

GEORGE GAILUS.